UNITED STATES PATENT OFFICE.

OSBORNE MACDANIEL, OF NEW YORK, N. Y.

IMPROVED PROCESS FOR CLEANING WOOLEN AND OTHER FABRICS.

Specification forming part of Letters Patent No. 71,191, dated November 19, 1867; reissue No. 3,240, dated December 22, 1868.

DIVISION B.

*To all whom it may concern:*

Be it known that I, OSBORNE MACDANIEL, of New York, in the county and State of New York, have invented a new and Improved Process for Cleaning Woolen and other Fabrics; and I do hereby declare that the following is a full, clear, and exact description thereof, which will enable others skilled in the art to understand and use the same.

This invention relates to an improvement in the process of cleaning woolen and other fabrics, which from any cause whatever may contain oily matters and impurities; and my improvement consists in the employment and use of the hydrocarbons or volatile oils known as petroleum-benzole, or petroleum-naphtha, for washing the said fibrous materials and extracting the fixed oils and impure oily matters therefrom by means of the solvent power of these volatile oils or either of them.

For this and similar purposes bisulphide of carbon, ether, chloroform, coal-tar benzole, and coal-tar naphtha, and other chemical solvents of the fixed oils, have been previously employed, as I am aware, but practical objections, on account of their high cost and limited supply, have prevented the general adoption and use of these chemical agents.

The practical objections to the use of coal-tar benzole and naphtha and other chemical agents upon the large scale of operations required for the purpose of this invention do not apply to petroleum-benzole and naphtha, which are incidental products of the petroleum-oil distilleries, so extensively in operation since the comparatively recent discovery and working of petroleum or earth-oil wells in this country. These volatile products of petroleum-oil are abundant and cheap, and prior to my invention have not been employed for the purpose thereof. Chemically, they are distinguished from coal-tar benzole and naphtha by the formula, petroleum benzole$=C^{12}H^{14}$, coal-tar benzole$=C^{12}H^{6}$, and are, therefore, distinct substances, chemically as well as commercially.

The mechanical appliances by which woolen or other fabrics, such as cloth just from the loom, which requires scouring to remove the oil with which the wool is saturated before being spun, woolen and cotton cop-waste which has been used for cleaning machinery, and old clothing for making shoddy and other fibrous materials, are cleaned by the application and use of petroleum-benzole and naphtha, consist of a washing-machine, connected with a still and condensing apparatus. The woolen or other fabrics to be cleaned are put into the washing-machine, which is a tub or vessel, so constructed as to be capable of being closed hermetically, and made steam-tight when in operation. The benzole or naphtha is then introduced into the closed vessel in sufficient quantity to dissolve and extract the oily matters and impurities contained in the woolen or other fabrics, which are to be subjected to agitation and movement with suitable apparatus in the washing-machine to cleanse them thoroughly.

Steam or other heat may be applied during the operation. The solution of benzole or naphtha and the oily matters and impurities extracted from the fibrous materials are then drawn off through a pipe and conveyed to a still, where the volatile oil is separated from all its impurities by distillation in the usual way, to be recovered pure and used over again. The oily matters and impurities are also thus separated and saved to be utilized.

After the impure solution has been drawn off from the washing-machine into the still, that portion of the volatile oil adhering to the fibrous material is evaporated by steam, hot water, or air, and driven through an ordinary goose-neck connecting the washing-machine with the condensing-coil of the still, whereby waste and loss of material are prevented.

In some cases the fibrous materials thus treated with petroleum-benzole or naphtha will be sufficiently cleansed and purified without further operation, and may be taken out of the washing-machine and dried, or may be dried therein by the application of steam or other heat, if desired. But in other cases it may be necessary also to subject the fibrous materials to a hot alkaline wash, in order to cleanse them completely of all adhering impurities.

I disclaim the use of bisulphide of carbon, ether, chloroform, coal-tar benzole, or coal-tar naphtha, and other chemical agents for the purpose aforesaid; but Having described the nature and character of my improvement, what I claim, and desire to secure by Letters Patent, is—

The employment and use of petroleum-benzole and naphtha, or either of them, for the purpose of cleaning woolen and other fabrics, substantially as herein described.

O. MACDANIEL.

Witnesses:
EDM. F. BROWN,
CHAUNCEY BESTOR.